United States Patent [19]

Watson

[11] 3,732,469

[45] May 8, 1973

[54] CAPACITOR WITH CERAMIC CHIP HELD IN COMPRESSION BOTH LATERALLY AND AXIALLY BY A GLASS SLEEVE

[75] Inventor: Alvin N. Watson, Glendora, Calif.

[73] Assignee: Monolithic Dielectrics, Inc., Burbank, Calif.

[22] Filed: May 30, 1972

[21] Appl. No.: 257,921

[52] U.S. Cl. ................317/261, 29/25.42, 174/52 S, 317/242

[51] Int. Cl. ..............................................H01g 1/02

[58] Field of Search ...........................317/242; 1/261; 174/52 S; 29/25.42

[56] References Cited

UNITED STATES PATENTS

| | | | |
|---|---|---|---|
| 3,250,969 | 5/1966 | Fanning | 174/52 S |
| 3,447,236 | 6/1969 | Hatcher | 174/52 S |
| 3,458,783 | 7/1969 | Rosenberg | 317/242 |

*Primary Examiner*—E. A. Goldberg
*Attorney*—D. Gordon Angus et al.

[57] ABSTRACT

A capacitor in which a ceramic chip is held compressively, both laterally and axially, between two metal heads by a peripheral glass sheath. A layer of malleable material is provided between the end faces of the chip and the head at each of the heads, and also a band of malleable metal extends peripherally around a cylindrical surface on each head which band is embraced by the glass sheath. The heads and sheaths are held together only by compressive force exerted by the sheath, the malleable metal providing a compressive joinder between the abutting faces resistive to thermal and mechanical shock. The metal also provides, between the sheath and heads, for relief of excessive forces due to variations and tolerances of the parts and for a reliable hermetic seal. The chip is laterally gripped by the glass sheath to hold it against shifting or tipping in the sheath, and the invention includes a method for shrinking the glass sheath onto the chip.

9 Claims, 4 Drawing Figures

PATENTED MAY 8 1973 3,732,469

CAPACITOR WITH CERAMIC CHIP HELD IN COMPRESSION BOTH LATERALLY AND AXIALLY BY A GLASS SLEEVE

This invention relates to improved monolithic ceramic capacitors of the type disclosed in U.S. Pat. No. 3,633,079 issued Jan. 4, 1972. The said United States patent shows a technique whereby a reliable electrical contact is formed between the monolithic ceramic chip and the metallic heads which abut it. A layer of malleable metal is interposed between each head and the glass sheath and between the chip and each head, which layers are resistive to thermal and mechanical shock, and can relieve excessive forces which result from the usage of parts whose dimensions vary somewhat from the optimum, but which layers still provide a reliable hermetic seal.

There has remained unsolved in this type of capacitor a potential problem of the shifting or cocking of the ceramic chip relative to the heads. It is an objective of this invention to provide a means which will overcome any tendency of the chip to shift or cock, and to provide a method for making such a construction.

A capacitor according to this invention includes a ceramic chip having a pair of opposed parallel end faces, a pair of metal heads bearing against the ceramic chip, and a surrounding glass sheath. A layer of malleable material is interposed between the end faces of the ceramic chip and the abutting faces of the heads, and also a peripheral layer (band) of malleable material surrounds both heads and is gripped by the glass sheath. The malleable metal deforms as a consequence of its malleability to fully conform to the opposed surfaces and thereby makes a good hermetic seal. These metals also have within themselves the inherent property of relieving excessive stresses imposed on them by flowing, and to prevent cracking of the glass sheath when it is thermally shrunk onto the heads, to accommodate for dimensional variations within tolerance limits, and also to resist cracking and other damage due to thermal and physical shock such as vibrational shock.

According to a feature of this invention, the glass sheath is thermally shrunk not only onto the heads but also against the chip itself so as to grip the same, not necessarily with a fully peripheral contact. This grip will prevent the chip from shifting or cocking between the heads, thereby overcoming a potential cause of intermittency in capacitors of this type.

According to another feature of the invention, the capacitor is made by first heating and thermally shrinking the glass sheath onto the heads in a relatively low ambient pressure to substantially accomplish the objectives of my aforesaid U.S. patent, namely the formation of a fluid-sealing joinder between the heads and the sleeve, and an abutting contact between the heads and the chip. Then, while the glass is still soft and hot, the ambient pressure is raised, thereby to exert a differential pressure on the wall of the sleeve that will press it against the ceramic chip so it will grip the chip when the assembly cools.

The above and other features of this invention will be fully understood from the following detailed description and the accompany drawings in which.

Figure 1:
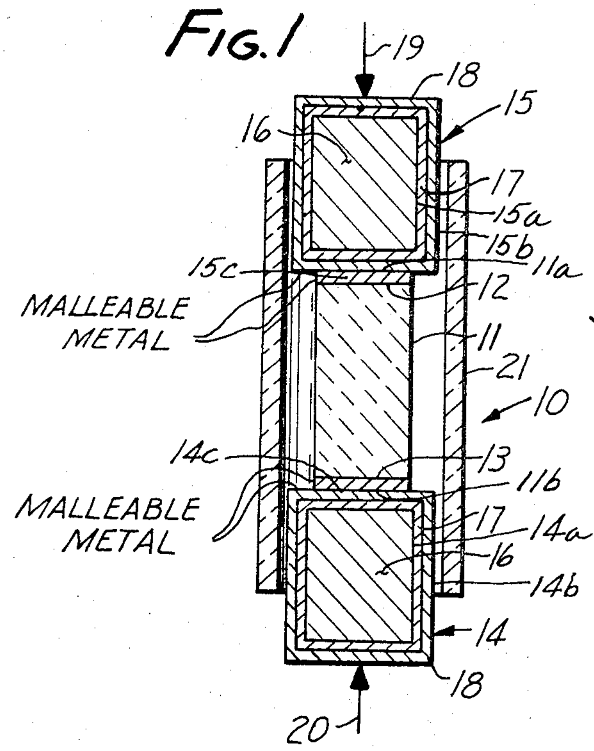
FIG. 1 is an axial cross-section showing the first step in the method of constructing the capacitor according to the invention.

Referring to the drawings, there is illustrated a monolithic ceramic capacitor 10 comprising a monolithic ceramic chip 11 having metal layers 12 and 13 clad to opposite ends thereof. Layers 12 and 13 may be thin layers of silver metal (a malleable metal). These layers are applied to or deposited onto each end of chip 11. Each of conductive heads 14 and 15 comprises a molybdenum body 16 having a nickel layer 17 deposited thereon and a layer 18 of silver (a malleable metal) deposited on the nickel layer. Malleable metals other than silver may be used instead. It is their property readily to change shape permanently as a consequence of sufficient applied loads.

By way of example, the nickel layer may be applied to the molybdenum body by firing nickel into the surface of the molybdenum head in a hydrogen atmosphere to provide a surface retentive to a thicker nickel layer which can be laid down by a subsequent operation. Nickel layer 17 is then applied to form a relatively hard nickel layer over the molybdenum body. Silver is thereafter fired into the nickel layer in a hydrogen atmosphere to make the nickel and the softer silver metal adherent, and the silver layer 18 is then applied to the nickel layer which has the silver fired into its surface. The silver layers on the chip which face toward the heads may be considered as its planar end faces 11*a* and 11*b*.

Heads 14 and 15 are then stacked on each side of chip 11 so that the silver layer on head 15 contacts silver layer 12 on chip 11, and so that the silver layer 18 on head 14 contacts the silver layer 13 on chip 11. The surface of the silver layers on the planar ends of the heads which face toward the chip may be considered as the planar faces 14*c* and 15*c* of the heads. A force is then applied to the heads in the direction of arrows 19 and 20 to hold the chip in a tight sandwich arrangement between heads 14 and 15. Typically, a pressure of about 20 psi is adequate for most constructions.

Glass sheath 21 is positioned over this stack as shown. It is shorter than the overall length of the stack and initially has a slight clearance so that the stack can readily be assembled. The glass sheath is longer than chip 11. Each of heads 14 and 15 has a cylindrical peripheral sidewall 14*a*, 15*a*, respectively. The silver on these sidewalls forms bands 14*b* and 15*b*, respectively, which extend continuously around the head. The sheath has an internal cylindrical sidewall 21*a* where it is in abutment with this cylindrical head construction. Central axis 21*b* is the axis of the cylindrical sidewalls of the heads, to which the planar faces of the heads are normal. End faces 11*a* and 11*b* are parallel to each other.

This assembly is then placed in a vacuum oven and the pressure is drawn down to about 29 inches of mercury. The glass sheath is of the type which shrinks when subjected to an elevated temperature in the sense of seeking to form relatively smaller dimensions of length and width. This phenomenon is not that of thermal shrinkage, but instead is analogous to surface tension phenomena. The glass itself has a positive thermal coefficient of expansion and will shrink when cooled, but that relates to another phenomenon. The assembly is heated in the evacuated oven to a temperature of about 710° C, in the course of which process the sheath makes a shrink fit onto heads 14 and 15. It may also tend to draw slightly in toward the chip but experience has shown that it ordinarily will not reach, and certainly will not reliably grip the chip without the application of external force. As the thermal shrinking occurs, the actual length of the device shortens in the direction of arrows 19 and 20 and sheath 21 makes a tight friction fit over heads 14 and 15 and as it shrinks imposes an axial force onto the heads in the directions of arrows 19 and 20 thereby providing an initial compressive force between the cladding on the chip and the cladding on heads 14 and 15. The glass sheath will make a tight fluid sealing fit with the malleable material around the heads. After the seal is made, the pressure in the oven is raised by relieving the vacuum, while maintaining the temperature elevated. As a result, there is a differential pressure across the soft wall of the sheath, because there is still a vacuum inside the sleeve.

The sheath will be pressed tightly against the chip by the force derived from the differential pressure. In many arrangements, the sheath will make a complete peripheral grip on the chip, but in others it may grip only the corners of the chip. In either event, the sheath grips the chip tightly laterally. There will of course also be some axial compressive pressure exerted on the heads, and this makes the electrical contact between the chip and the heads even more reliable. When the heating process is concluded, the parts are allowed to cool. At this time the glass, having a positive coefficient of thermal expansion will dimensionally shrink, drawing the sheath even more tightly against the chip and against the periphery of the heads. As a consequence the chip is firmly trapped and cannot shift or cock. The malleable layers flow to relieve excessive forces and prevent cracking of the sheath.

The glass sheath 21 is of the type whose thermal coefficient of expansion closely matches that of the molybdenum heads 14 and 15. Hence, the arrangement remains intact even when subjected to severe temperature changes. This glass is commercially available as "-Moly-matching glass" from Corning Glass Company and others. The glass is available containing lead oxide, and some glasses are available which are alkaline free. The alkaline-free glass is particularly useful in connection with precision capacitors to prevent the sheath from affecting the operation of the capacitor.

Figure 2:
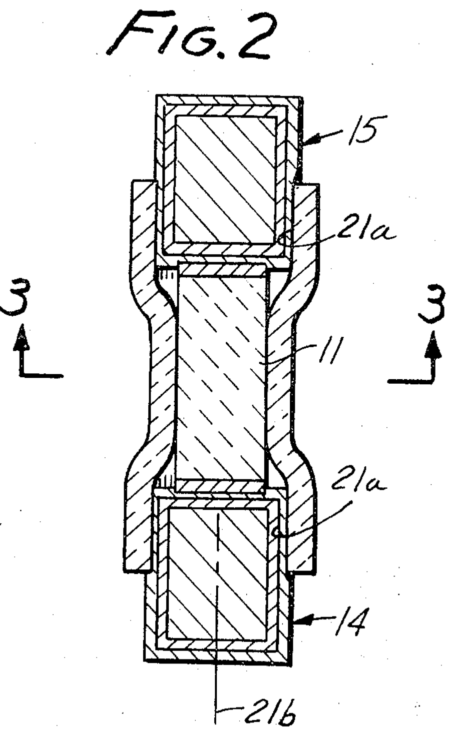
FIG. 2 is an axial cross-section of the completed capacitor.
Figure 3:
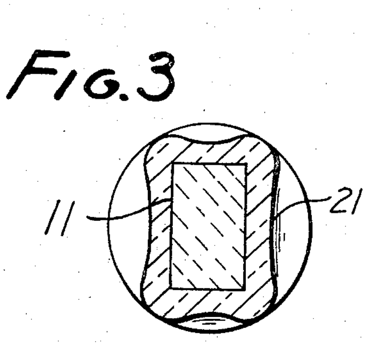
FIG. 3 is a cross-section taken at line 3—3 of FIG. 2.
Figure 4:
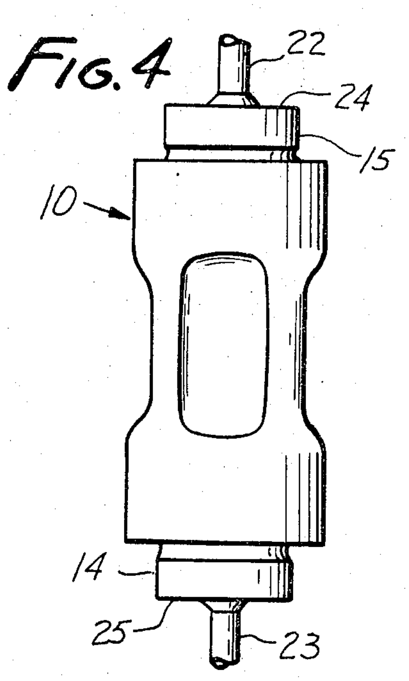
FIG. 4 is a side elevation of the completed capacitor.

Upon completion of the part as illustrated in FIGS. 2 and 3, electrical leads 22 and 23 may be brazed to the outer surface 24 and 25, respectively, of heads 14 and 15. One feature of the invention resides in the fact that leads 22 and 23 may be constructed of any desirable material, such as copper, silver, tungsten, or even aluminum, depending upon the ultimate use of the device 10.

Another feature of the invention resides in the fact that if the "Moly-matching glass" forming sheath 21 contains lead oxide, and if the leads 22 and 23 are brazed onto heads 14 and 15 in a "forming" gas atmosphere containing up to 15 percent hydrogen and more than 85 percent nitrogen, the glass forming sleeve 21 will turn to a dark, almost black, color, so that the part need not be coated or painted to make it attractive. The brazing of leads 22 and 23 may be accomplished in any atmosphere and at any desirable pressure but preferably not below ordinary atmospheric pressure, and may be accomplished at any temperature below the sealing temperature of the glass-forming sleeve 21. It is preferred that the brazing be accomplished in a forming glass atmosphere at a pressure somewhat above ordinary atmospheric pressure. All temperatures are below those at which contiguous layers of the malleable metal would fuse.

The capacitor in accordance with the present invention is a particularly rugged device. Chip 11 is held under a compressive force between heads 14 and 15 due to the axial draw caused by the shrinkage of sheath 21. While a force is applied in the direction of arrows 19 and 20 during the construction of the device, sheath 21 by being shrunk over heads 14 and 15, holds the device together with a compression force after the external force is removed, and assures positive electrical contact between heads 14 and 15 and the chip. The gripping of the chip by the sheath provides an additional assembly force.

The capacitor is efficient in operation and may readily be manufactured in volume, and its leads may be added separately according to ultimate use. The capacitor manufactured in accordance with the present invention is more reliable than prior sealed components in that there exists a lesser degree of failure due to breakage of electrical connection between the chip and its lead in capacitors, particularly compared to devices in which the head is brazed to the chip.

Layers 12 and 18 are of malleable material. It is an inherent function of malleable material that forces exerted thereto can cause cold flow of the material. Accordingly, the provision of a malleable material between the opposed end faces of the ceramic chip and of the head, and between the inner sidewall of the glass sheath and the outer sidewall of the head will provide a metallic region whose surfaces will conform to fit an opposed surface in full hermetic sealing contact, and an element in which movement of the metal is possible to relieve excessive forces, such as excessive compressive forces exerted by the glass sheath when it cools, occasioned by using too small a diameter of sheath wijh too large a diameter of head, both of which might represent the outer limits of the tolerances for assembly of the device, and also to relieve the region between the chip and the head from similar excessive forces. It will be noted that in this invention there is no bonded or welded junction between any of the surfaces of the type which would resist tensile forces. Instead, if the glass sheath were broken, everything would simply fall apart. It is this joinder by pure compressive relationships which frees the device from many problems of prior art devices.

This invention is not to be limited by the embodiment shown in the drawings and described in the description, which is given by way of example and not of limitation, but only in accordance with the scope of the appended claims.

What is claimed is:

1. A capacitor comprising: a ceramic chip having a planar end face at two opposite ends, said end faces being parallel to each other, a pair of conductive metal heads, each head including a planar face and a cyindrical peripheral sidewall, the sidewall having a central axis and the planar face lying normal to said central axis, one of said planar faces lying adjacent to each of said end faces; a band of malleable metal on said peripheral sidewall extending continuously around the same; a glass sheath having an internal cylindrical sidewall, all of the chip and at least part of both heads and of their bands of malleable metal lying axially within the sheath, the heads and chip being held by the sheath in a compressive electrically conductive joinder by axial force exerted by the sheath, the heads and chip not being joined to each other, but instead remaining as free bodies without bonding or discontinuous interconnection between them, the sidewall of the sheath bearing against the malleable band to form a surface-to-surface, nonbonded, contiguous, hermetically sealing joinder, the band conforming to the surface configuration of the sidewall of the sheath, the chip, heads and sheath being held assembled only by compressive force exerted by the sheath, the malleable band serving as a stress-relieving element to relieve force loads derived from temperature change and external forces, said relief occurring as a consequence of deformation inherent in the malleability and of the absence of joinder of a class resistive to tensile forces, and the sheath being in gripping contact with the chip so as to hold it against shifting or cocking.

2. A capacitor according to claim 1 in which the malleable band is comprised of silver.

3. A capacitor according to claim 1 in which the glass of which the sheath is made is of a type which, when in tubular shape, its inner sidewall will shrink dimensionally when at a temperature below its melting point, whereby to exert a grip on the sidewalls of the heads.

4. A capacitor according to claim 3 in which the thermal coefficients of expansion of the glass and of the metal of which the heads are made are substantially equal.

5. A capacitor according to claim 1 in which a layer of malleable material is carried on one of said faces and is therefore interposed between them, the said layer also serving as a stress-relieving element to relieve force loads derived from temperature change and external forces, said relief occuring as a consequence of deformation inherent in the malleability and of the absence of joinder of a class resistive to tensile forces.

6. A capacitor according to claim 5 in which the malleable layer and band are made of silver.

7. A capacitor according to claim 5 in which the glass of which the sheath is made is of a type which, when in tubular shape, its inner sidewall will shrink dimensionally when at a temperature below its melting point, whereby to exert a grip on the sidewalls of the heads.

8. A capacitor according to claim 7 in which the thermal coefficients of expansion of the glass and of the metal of which the heads are made are substantially equal.

9. The method of making a capacitor comprising a ceramic chip, a pair of metal heads at opposite ends of the chip, and a glass sheath surrounding the chip and at least parts of each head and making a fluid-tight fit with both of said heads, said method comprising the following steps in the order recited:

a. Forming a loose assembly of the chip, heads and sheath and placing the same in a vacuum oven;
b. Evacuating the oven and heating the assembly at least to the softening point of the glass sheath, whereby the sheath makes a fluid-tight fit with both heads;
c. Raising the pressure in said oven while maintaining the glass in the said softened condition to exert a differential pressure which creates a force that will press the sheath against the chip; and
d. Cooling the assembly.

* * * * *

UNITED STATES PATENT OFFICE
CERTIFICATE OF CORRECTION

Patent No. 3,732,469 Dated May 8, 1973

Inventor(s) ALVIN N. WATSON

It is certified that error appears in the above-identified patent and that said Letters Patent are hereby corrected as shown below:

Col. 3, lines 45-46, ' "-Moly-matching glass" ' should read --"Moly-matching glass"--

Col. 4, line 8, "glass" should read --gas--

Col. 4, line 47, "wijh" should read --with--

IN THE DRAWINGS:

In Fig. 1, the lead line for 15c is to be directed to the surface of layer 18 that is contiguous to layer 12, instead of to layer 12.

In Fig. 2, the lead line for the lower one of numbers 21a should be directed to the inner wall of sheath 21, instead of to layer 18.

Signed and sealed this 17th day of December 1974.

(SEAL)
Attest:

McCOY M. GIBSON JR.
Attesting Officer

C. MARSHALL DANN
Commissioner of Patents